Nov. 23, 1965     D. S. DIXLER     3,219,475
TRANSPARENT MULTIPLE LAYER COATED POLYVINYL ALCOHOL FILM
Filed Feb. 15, 1962
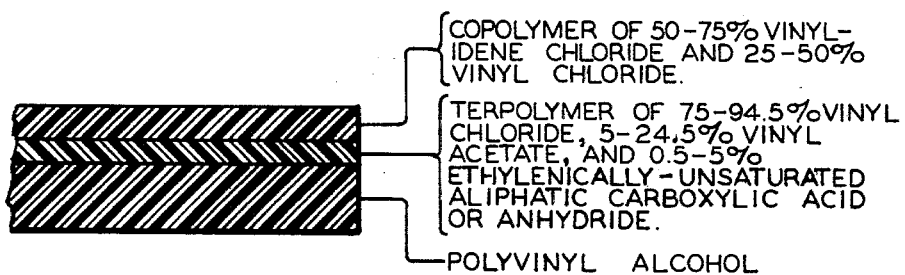
INVENTOR
DANIEL S. DIXLER
ATTORNEY 3,219,475
TRANSPARENT MULTIPLE LAYER COATED
POLYVINYL ALCOHOL FILM
Daniel S. Dixler, Berkeley Heights, N.J., assignor, by mesne assignments, to Cumberland Chemical Corporation, New York, N.Y., a corporation of Delaware
Filed Feb. 15, 1962, Ser. No. 173,359
6 Claims. (Cl. 117—76)

This invention relates to transparent packaging films and more particularly to coated films having a polyvinyl alcohol base, a vinylidene chloride-vinyl chloride copolymer outer coating, and an adhesive coating therebetween.

A number of coated transparent film compositions have been previously described in the art for use as packaging films. While some of these films are reported to have low permeability to oxygen, the permeability nevertheless is not low enough to permit storage of perishable foods for long periods of time. For example, various food products such as ground meat, luncheon meat, and cheese, deteriorate in a comparatively short period of time when wrapped in presently known coated plastic films.

An object of this invention is to provide a coated transparent plastic film having extremely low oxygen permeability.

Another object of this invention is to provide a packaging film having as its base polyvinyl alcohol of low oxygen permeability.

A further object of this invention is to provide a film which comprises a polyvinyl alcohol base and a vinylidene chloride-vinyl chloride copolymer coating.

A still further object is to provide a subcoating which adheres readily to both the polyvinyl alcohol base and the vinylidene chloride-vinyl chloride copolymer outer coating.

These and other objects will be apparent from the specification.

The packaging film compositions of this invention comprise a thin flexible base layer of polyvinyl alcohol coated with an undercoat of a terpolymer of about 75 to 94.5% vinyl chloride, about 5 to 24.5% vinyl acetate, and about 0.5 to 5% of a compound selected from the group consisting of ethylenically unsaturated aliphatic carboxylic acids and anhydrides thereof, and a topcoat of a copolymer of about 50 to 75% vinylidene chloride and about 25 to 50% vinyl chloride.

The accompanying drawing illustrates in a cross-sectional view the novel coated film of this invention. In the drawing, the base of polyvinyl alcohol, the undercoat of a terpolymer of vinyl chloride, vinyl acetate and ethylenically-unsaturated aliphatic carboxylic acid or anhydride, and the topcoat of a copolymer of vinylidene chloride and vinyl chloride, are identified by legends.

Polyvinyl alcohol is a very desirable base material for packaging films because it has a low oxygen permeability as compared to other materials, such as regenerated cellulose, which are at present commonly used for packaging. Polyvinyl alcohol also has good tensile strength, elongation, tear strength, and bursting strength, and is readily shaped by conventional techniques using heat and vacuum. However, uncoated polyvinyl alcohol is not suitable for general use as a packaging film because the oxygen permeability of the material increases when the film is in a high humidity atmosphere. It is necessary to coat the polyvinyl alcohol base film with a material which will protect it from water vapor in the atmosphere, in order to preserve its oxygen barrier properties.

The topcoat layer in the film of this invention is a vinylidene chloride-vinyl chloride copolymer containing from about 50 to 75% by weight of vinylidene chloride and conversely about 25 to 50% by weight of vinyl chloride. An excellent coating composition is a copolymer of about 60% by weight of vinylidene chloride and about 40% by weight of vinyl chloride. This copolymer is commercially available under the trade name "Geon 222" which is made and sold by the B. F. Goodrich Co., Akron, Ohio.

Copolymers of vinylidene chloride and vinyl chloride do not readily adhere to polyvinyl alcohol; hence it is necessary to provide a means for bonding the vinylidene chloride-vinyl chloride copolymer to the polyvinyl alcohol base. It has been found that a good bond is secured with an undercoat layer of a terpolymer of vinyl chloride, vinyl acetate, and either an ethylenically unsaturated carboxylic acid or an anhydride thereof. This terpolymer adheres readily to both polyvinyl alcohol and vinylidene chloride-vinyl chloride copolymers providing a firm bond between the base and topcoat layers. The terpolymer contains about 75 to 94.5% by weight vinyl chloride, about 5 to 24.5% by weight vinyl acetate, and about 0.5 to 5% by weight of the ethylenically unsaturated acid or anhydride. The unsaturated acid or anhydride is preferably a compound containing 3 to 6 carbon atoms, such as acrylic acid, methacrylic acid, crotonic acid, maleic acid, maleic anhydride, itaconic acid, and the like. Maleic anhydride is a preferred compound. The unsaturated acid or anhydride is an essential constituent of the undercoat which confers affinity for the polyvinyl alcohol base. The amount should be as small as possible consistent with good adhesion of the undercoat to the base. Amounts in the range of 0.5 to 2% are ordinarily preferred. Excellent terpolymers for use as an undercoat are a terpolymer containing about 86% vinyl chloride, 11% vinyl acetate, and 3% maleic anhydride, made and sold by the B. F. Goodrich Co. under the trade name "Geon 443," and a terpolymer of 84% vinyl chloride, 15% vinyl acetate, and 1% maleic anhydride, made and sold by the Union Carbide Corporation, New York, New York, under the trade name "Vinylite VMCH."

The thickness of the undercoat layer is not critical. Generally the thickness is about 0.0001 inch or less. Good adhesion of the topcoat to the base is obtained even with very thin undercoat layers. It is desirable not to have the undercoat layer any thicker than necessary, since excess thickness reduces flexibility of the film without significantly affecting properties such as permeability and bonding strength.

Films of this invention can be coated on either one side or both sides as afore-described; the latter is preferable.

The coating can be applied to the polyvinyl alcohol base by any means known in the art. For example, the undercoat terpolymer can be dissolved in a suitable solvent such as methyl ethyl ketone or methyl isobutyl ketone, usually in dilute solution, e.g., about 1 to 5% by weight. The concentration of the solution is varied in accordance with the thickness of coating desired. The solution can be applied to the polyvinyl alcohol surface using conventional coating machinery. The film is then dried at any desired temperature, e.g., about 40° to 110° C. The topcoat vinylidene chloride-vinyl chloride copolymer can then be applied in solution in a suitable organic solvent such as methyl ethyl ketone, methyl isobutyl ketone, ethyl acetate, tetrahydrofuran, and the like. The film is preferably again dried.

This invention will now be described with reference to specific embodiments thereof as illustrated by the following examples:

*Example 1*

A thin transparent film of 99.9% hydrolyzed polyvinyl alcohol, plasticized with 4 parts by weight of glycerol per 100 parts of polyvinyl alcohol, having a thickness of approximately 0.0008 inch, was coated on both sides in sequence with a 1% solution of a terpolymer of about 86% vinyl chloride, 11% vinyl acetate, and 3% maleic anhydride in methyl ethyl ketone. The terpolymer was a commercially available material sold under the trade name "Geon 443" by the B. F. Goodrich Co., Akron, Ohio. The film was dried at 180° F. for about 2 minutes after each side was coated. A 15% solution of a copolymer of 60% vinylidene chloride and 40% vinyl chloride, sold under the trade name "Geon 222" by the B. F. Goodrich Co., in methyl ethyl ketone was then applied as a topcoat to both sides in sequence. The film was dried at 180° F. for about 2 minutes after each coating. The total thickness of the coated film was about 0.0013 inch, which corresponds to a coating thickness of 0.00025 inch on each side.

The coated film had an oxygen permeability of less than 0.01 cc./100 in $^2$/day at 72° F. and 50% relative humidity, and an oxygen permeability of 0.07 cc./100 in $^2$/day at 72° F. and 90% relative humidity. Oxygen permeabilities were measured by diffusion of oxygen through the film from an essentially pure oxygen atmosphere to an oxygen-free atmosphere, both at a total pressure of one atmosphere, at the indicated temperature and relative humidity. Water vapor permeability, adherence of the coating layers to the base layer, and heat seal strength were all satisfactory.

*Example 2*

A thin transparent film of 99.9% hydrolyzed polyvinyl alcohol, plasticized with 10 parts of glycerol plus 5 parts of 1,3-butanediol per 100 parts of polyvinyl alcohol, was oven dried first at about 180° F. and then at about 200° F. for a total drying time of about one minute. A base coat of the vinyl chloride-vinyl acetate-maleic anhydride terpolymer described in Example 1 was applied as a 1% solution in methyl ethyl ketone to both sides of the polyvinyl alcohol base in sequence. The film was oven dried at 180° to 200° F. for one minute after each coating. A topcoat of the vinylidene chloride-vinyl chloride copolymer described in Example 1 was then applied as a 15% solution in methyl ethyl ketone, and the film was oven-dried at 180° to 200° F. for one minute after each coating. The total thickness of the coated film was about 0.0014 to 0.0015 inch, corresponding to a coating thickness of about 0.00013 inch on each side.

The oxygen permeability of the coated film was 0.12 cc./100 in $^2$/day at 50% relative humidity and 0.84 cc./100 in $^2$/day at 90% relative humidity.

I claim:

1. A coated film comprising a polyvinyl alcohol base sheet coated on at least one side with an undercoat of a terpolymer of about 75 to 94.5% vinyl chloride, about 5 to 24.5% vinyl acetate, and about 0.5 to 5% of a compound selected from the group consisting of ethylenically unsaturated aliphatic carboxylic acids and anhydrides thereof, and a topcoat of a copolymer of about 50 to 75% vinylidene chloride and about 25 to 50% vinyl chloride, said topcoat being thicker than said undercoat and being continuous.

2. A coated film comprising a polyvinyl alcohol base sheet coated on at least one side with an undercoat of a terpolymer of about 75 to 94.5% vinyl chloride, about 5 to 24.5% vinyl acetate, and about 0.5 to 5% maleic anhydride, and a topcoat of a copolymer of about 50 to 75% vinylidene chloride and about 25 to 50% vinyl chloride, said topcoat being thicker than said undercoat and being continuous.

3. A coated film comprising a polyvinyl alcohol base sheet coated on at least one side with an undercoat of a terpolymer of about 75 to 94.5% vinyl chloride, about 5 to 24.5% vinyl acetate, and about 0.5 to 5% of a compound selected from the group consisting of ethylenically unsaturated aliphatic carboxylic acids and anhydrides thereof, and a topcoat of a copolymer of about 50 to 75% vinylidene chloride and about 25 to 50% vinyl chloride, said undercoat having a maximum thickness of 0.0001 inch and said topcoat being thicker than said undercoat and being continuous.

4. A coated film comprising a polyvinyl alcohol base sheet coated on at least one side with an undercoat of a terpolymer of about 75 to 94.5% vinyl chloride, about 5 to 24.5% vinyl acetate, and about 0.5 to 5% maleic anhydride, and a topcoat of a copolymer of about 50 to 75% vinylidene chloride and about 25 to 50% vinyl chloride, said undercoat having a maximum thickness of 0.0001 inch and said topcoat being thicker than said undercoat and being continuous.

5. A coated film comprising a polyvinyl alcohol base sheet coated on at least one side with an undercoat of a terpolymer of about 84 to 86% vinyl chloride, about 11 to 15% vinyl acetate, and about 1 to 3% maleic anhydride, and a topcoat of a copolymer of about 50 to 75% vinylidene chloride and about 25 to 50% vinyl chloride, said topcoat being thicker than said undercoat and being continuous.

6. A coated film comprising a polyvinyl alcohol base sheet coated on at least one side with an undercoat of a terpolymer of about 84 to 86% vinyl chloride, about 11 to 15% vinyl acetate, and about 1 to 3% maleic anhydride, and a topcoat of a copolymer of about 60% vinylidene chloride and about 40% vinyl chloride, said topcoat being thicker than said undercoat and being continuous.

References Cited by the Examiner

UNITED STATES PATENTS

| | | | |
|---|---|---|---|
| 2,748,027 | 5/1956 | Meier | 117—76 |
| 2,943,937 | 7/1960 | Nadeau et al. | |
| 2,990,391 | 6/1961 | Grantham. | |

OTHER REFERENCES

Zimmerman, O. T., and Lavine, I.: Material Trade Names, Handbook of Industrial Research Service, Dover, N.H. (1953), pages 253–254, 606 and Supplement III, pages 105–106.

RICHARD D. NEVIUS, *Primary Examiner.*